March 19, 1946.  E. S. LEA  2,396,795
METHOD FOR APPLYING HELICAL FINS TO CYLINDRICAL BODIES
Filed March 21, 1942  5 Sheets-Sheet 1

INVENTOR
EDWARD S. LEA
BY
ATTORNEYS

March 19, 1946. E. S. LEA 2,396,795
METHOD FOR APPLYING HELICAL FINS TO CYLINDRICAL BODIES
Filed March 21, 1942 5 Sheets-Sheet 2
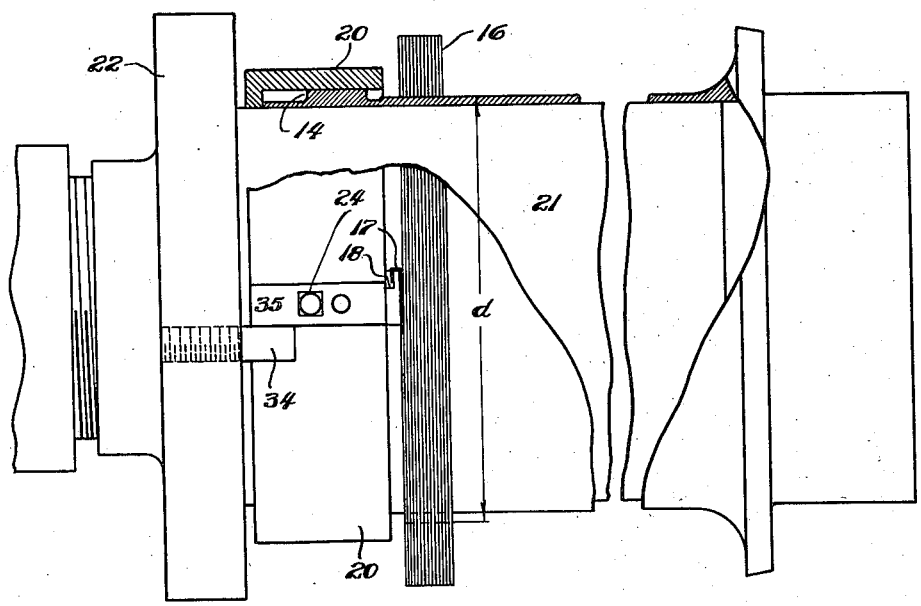
Fig 5
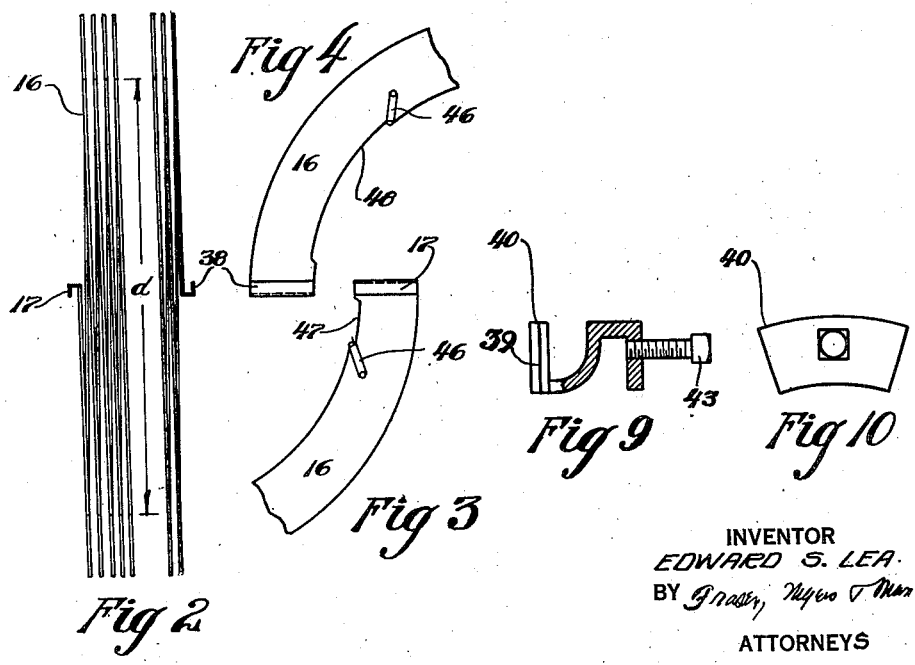
Fig 4
Fig 2
Fig 3
Fig 9
Fig 10
INVENTOR
EDWARD S. LEA.
BY
ATTORNEYS March 19, 1946. E. S. LEA 2,396,795
METHOD FOR APPLYING HELICAL FINS TO CYLINDRICAL BODIES
Filed March 21, 1942 5 Sheets-Sheet 3
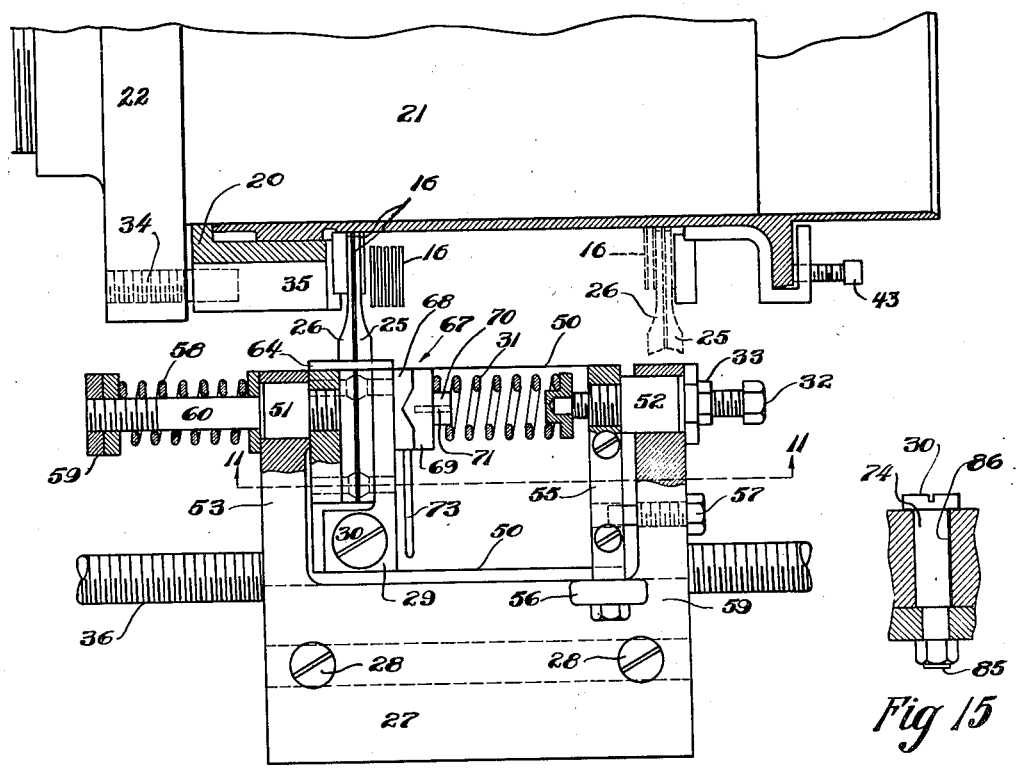
Fig 6
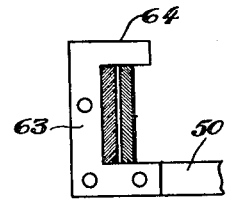
Fig 15
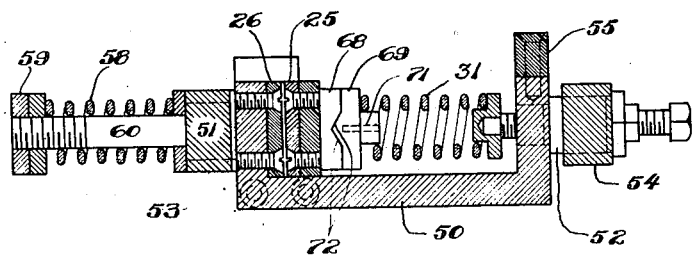
Fig 12
Fig 11
INVENTOR
EDWARD S. LEA
BY Fraser, Myers & Manley
ATTORNEYS March 19, 1946.  E. S. LEA  2,396,795
METHOD FOR APPLYING HELICAL FINS TO CYLINDRICAL BODIES
Filed March 21, 1942  5 Sheets-Sheet 4

INVENTOR
EDWARD S. LEA
BY Fraser, Myers & Manley
ATTORNEYS

March 19, 1946.    E. S. LEA    2,396,795
METHOD FOR APPLYING HELICAL FINS TO CYLINDRICAL BODIES
Filed March 21, 1942    5 Sheets-Sheet 5

INVENTOR
EDWARD S. LEA
BY Fraser, Myers & Manley
ATTORNEYS

Patented Mar. 19, 1946

2,396,795

UNITED STATES PATENT OFFICE 2,396,795

METHOD FOR APPLYING HELICAL FINS TO CYLINDRICAL BODIES

Edward S. Lea, Morrisville, Pa., assignor to Buensod-Stacey, Incorporated, a corporation of Delaware Application March 21, 1942, Serial No. 435,728

6 Claims. (Cl. 29—157.3)

This invention relates to a method of forming heat-radiating fins on cylindrical bodies, and since it has been especially devised for the application of air-cooling fins to aircraft engine cylinders and the like, it will be described with particular reference to its utility in such an operation.

The principal object of the invention is to provide a method of applying a separately formed cooling fin to the finished surface of the barrel of an aircraft engine cylinder. This makes for economy in that the forging from which the barrel is machined to final form may be lighter than that now used by an amount equal to the weight of the present integral fins and of the material which must be cut away in forming them. The method also makes for speed of production in that the separately formed fins may be applied in but a fraction of the time now needed to machine the fins into the barrel. Of equal importance, the method permits the fins to be made of copper or of any other metal which has the ability to dissipate heat more rapidly and effectively than the present integral steel fins. This means that a smaller cooling surface may be employed, with a consequent reduction in weight and frontal area of the finished barrel, or that the power of the engine may be stepped up far beyond any limits now set by the ability of the steel fins to maintain the engine at a proper operating temperature.

It is a more specific object of the invention to provide a method by which a preformed helix of striplike fin material may be given an inside diameter such as to permit it to be passed over an enlarged shoulder upon one end of the cylinder barrel at the start of the finning operation, and may then be reduced in diameter until the inner edge of the strip rests firmly upon the cylindrical surface of the barrel so that it may ultimately be bonded to that surface or otherwise be secured in place.

It is yet another object of the invention to provide for the soldering of substantially the entire inner edge of a separately applied helical fin to the surface of the barrel on which it rests whereby to secure a perfect mechanical as well as a thermal bond between the metal of the fin and that of the barrel.

It is a further object of the invention to provide a method of applying a preformed helical fin to a cylinder barrel which has been machined substantially to its final size, and of straightening and stiffening that fin after it has been secured in place. Thus the fin, at the start of the operation, may be comparatively soft in order to facilitate its application, and after that operation has been completed it may be hardened sufficiently to be capable of withstanding the shocks and abuse which it will get in normal operation of the engine of which the cylinder is a part. Likewise, the fin may be twisted and warped by the heat of the bonding operation, if it is soldered or welded to the body as is frequently the case, and yet in the finished product the fin will be perfectly flat and will lie substantially perpendicular to the cylinder surface.

It is a further object to provide a method employing an inexpensive machine of simple design and rugged construction which can be operated by a relatively unskilled mechanic to carry out the several steps of the method of the invention at high speed, thus permitting the method to be put into practice with a minimum expense and delay for tooling up.

The foregoing and other objects of the invention, as well as various features thereof, will be more fully understood from the following description when read in the light of the accompanying drawings, in which—

Fig. 2 is an elevational view of a preformed helical fin which is adapted to be applied to the cylinder barrel of Fig. 1 by the method of the present invention;

Figs. 3 and 4 are plan views of the leading and trailing ends of the fin of Fig. 2;

Fig. 5 is an elevational view of a cylinder having the fin of Fig. 2 fitted over its barrel, with its leading end secured to one end of the cylinder, this view illustrating the fin at an intermediate stage of its application to the cylinder;

Fig. 6 is a plan view, partly in section, of a fragment of a machine embodying the principles of the invention and designed to carry out several of the steps of the method, and illustrates that method at another one of its intermediate stages;

Fig. 9 is a sectional view of a clamping member which is used to secure the trailing end of the fin in fixed relation to the cylinder barrel at the completion of one of the steps of the method;

Fig. 10 is a front view of the clamp of Fig. 9;

Fig. 11 is a sectional view taken on the line 11—11 of Fig. 6;

Fig. 12 is a sectional view of a portion of the machine of Fig. 6;

Figs. 13, 14 and 15 are elevational views illustrating the details of certain portions of the machine of Figs. 6 and 11;

Figure 1:
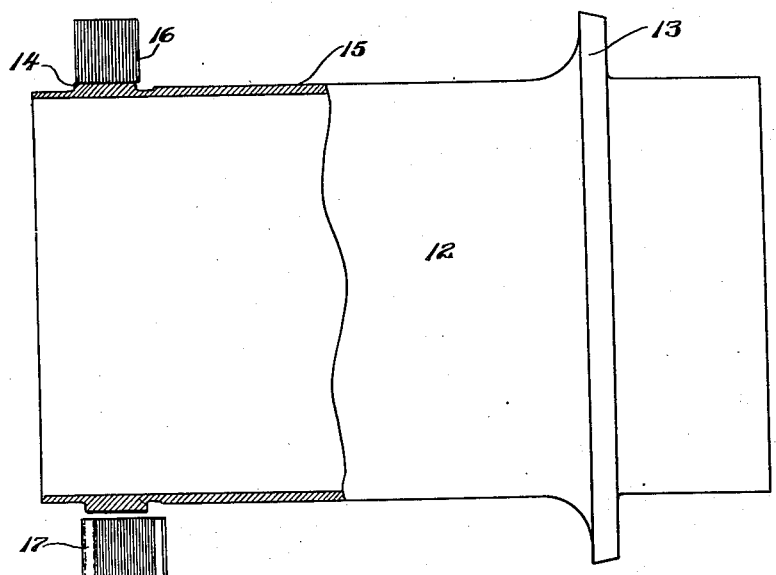
Figure 1 is an elevational view, partly in section, of a barrel of a standard airplane engine cylinder having an outer cylindrical surface adapted to receive separately formed cooling fins.

In the drawings, and referring first to Fig. 1, numeral 12 identifies generally a forged steel barrel having a flange 13 near one of its ends by which the barrel may ultimately be secured to the crankcase of an engine, an enlarged shoulder 14 near its other end, which shoulder will subsequently be threaded to receive a conventional cylinder head, and an intervening cylindrical surface 15 of lesser diameter than either the flange or the shoulder. This barrel is typical of those now widely used in aircraft engines except insofar as it has a very thin central section over which separately formed fins may be applied by the method and apparatus of the present invention, instead of the usual much thicker section which has been cut away to form a series of integral fins. It follows, of course, that the forging for the barrel 12 may be lighter than that for a standard barrel by an amount which is equal to the weight of the integral fins of the latter plus that of the scrap produced in forming them. Other constructional details of the barrel have no pertinence to the present invention and accordingly have not been illustrated.

It will be assumed for purposes of description that a copper fin is to be applied to the just-described barrel. In accordance with the preferred method a flat strip 16 of this metal is first rolled to form a helix (Fig. 2) having an inside diameter $d$ which is such as to permit the helix to be passed endwise over the barrel. In the illustrated case this diameter must be about equal to or slightly greater than that of the shoulder 14 so that it may be passed over that enlarged portion (Fig. 1) and be brought to rest on the smaller diametered surface 15. At this stage of the operation the helical strip will rest loosely upon the barrel with its convolutions touching one another, as is shown in Fig. 5. In the next step of the method that strip is progressively drawn out from one end to the other whereby to reduce the inside diameter of the helix to that of the outside of the barrel and simultaneously to locate its convolutions at regularly spaced intervals along surface 15. When the inner edge of the strip has been caused tightly to engage the surface of the barrel in this way, and its convolutions have been appropriately spaced one from another, then the fin may be secured to the barrel in any suitable way. Preferably its entire inner edge is soldered or welded to the barrel in order to form a substantially perfect thermal as well as mechanical bond between the two. If desired, however, the strip may be mechanically secured in place in some other way, as, for example, by clamping its ends to the barrel or to the immediately adjacent convolutions of the helix.

It will usually be found that the fin has been accidentally twisted out of shape following the drawing-out step, or that the heat of the bonding operation, i. e., soldering, welding, brazing or the like, has caused some considerable warping. Furthermore, the fin at this step of the method may not be hard or stiff enough to be capable of withstanding the abuse which is incident to normal engine operation. The copper helix, for example, is usually made dead-soft at the start of the finning process in order to facilitate its application to the barrel, and, even though it may be hardened by mechanical work during that operation, it will be annealed by the heat of the bonding step. If left in this condition it would soon be so badly twisted and bent in normal use and servicing of the barrel as to be of little or no utility. The method accordingly includes an additional step in which the fin is progressively squeezed from one end to the other whereby simultaneously to straighten and mechanically work it to a desired final hardness. In the event that no hardening is required, this step may be limited to a mere ironing of the fin to a flat condition. If, however, the fin is undesirably soft at the completion of the bonding operation, then it should be progressively squeezed to such an extent as to work-harden it during the straightening step. It is evident that the just-described step of the method may be carried out immediately following the bonding operation, or it may be delayed until such time as other manufacturing operations have been performed upon the barrel. In any event, when the applied strip has been straightened and hardened, the finning operation is complete.

The method may be better understood by referring to Figs. 5 to 15, inclusive, which show the details of a machine designed to carry out several of its essential steps. The preforming of the helical strip 16 and its application over the enlarged end of barrel 12 have already been described. Preliminary to the drawing-out step the leading end of the strip is secured to the barrel in any suitable way. This may conveniently be done by inserting the hook 17, which has been formed at the end of the strip for that purpose, in a slot 18 of a clamp 19, the clamp preferably comprising a part of a driving ring 20 which has theretofore been secured on the end of the barrel by setscrew 24. When this has been done, the barrel is fitted to a stub arbor 21 with the driving ring disposed adjacent face plate 22. The arbor, face plate, and certain other elements hereinafter considered, may be parts of any standard screwcutting lathe the construction and operation of which is sufficiently well known not to require description and illustration here. At this point, the leading end of strip 16, immediately adjacent clamp 19, is engaged between a pair of tools 25, 26, which are mounted on a frame 27 secured by screws 28 to the cross slide of the lathe so that they may be advanced toward and withdrawn from the cylinder barrel at appropriate times. One of the tools, 25, is preferably secured to an arm 29 which is mounted to swing about pivot pin 30; and a spring 31 serves to urge this tool inwardly whereby to squeeze the strip between its inner face and that of the fixed tool 26. The pressure which must be applied to the strip by the tools will depend upon the size and thickness of the strip, and upon the extent to which the diameter of the helix must be reduced. In the illustrative case it has been found that the tools should actually deform the surfaces of a copper strip. Thus, when the tools have been advanced toward the barrel, and the leading end of the strip 16 has been disposed between them, the tension of spring 31 may be adjusted by screw 32 whereby to squeeze the strip to a desired degree; and the screw may then be locked in its adjusted position by lock-nut 33.

The preliminary set-up for the drawing-out step of the method is now complete; and the relative positions which the barrel, strip and ironing tools occupy at the beginning of that step are shown in full lines in Fig. 6. Upon the starting up of the machine, a driving pin 34 carried by the face plate engages cross flange 35 of the driving ring, thereby rotating barrel 12 about its own axis and drawing strip 16 between the ironing tools. Simultaneously, the frame 27, and the tools which it carries, are advanced lengthwise of the barrel by automatic feed screw 36 at a uniform rate which is set by the relative speeds of the arbor 21 and of the feed screw. This action therefore serves to locate the convolutions of the strip at regularly spaced intervals along surface 15, and at the same time to draw out the strip progressively until its inner edge tightly engages the barrel.

The drawing out of the helical strip to reduce its inside diameter to that of the outside of the barrel may have three separate components. First, there is the normal reduction in diameter which is occasioned by the stretching of the helix, that is to say, by the increase in spacing between its convolutions from the touching condition which existed when the helix was applied to the barrel to that existing when the fin is properly located at spaced intervals along surface 15. Next, the tightening of the helix as it is twisted about its own axis, much as a spring is wound, causes some reduction of its internal diameter. In certain cases the drawing-out step may be limited to these two phases. If, for example, the helix has an initial inside diameter $d$ which is substantially equal to the outside diameter of the surface over which the fin is to be applied, then its reduction in the foregoing manner may be entirely adequate to cause the inner edge of the fin tightly to engage the surface. Where, however, the helix must be passed over any considerable enlargement at the end of the barrel, then the drawing-out step will include a further component, namely, an actual drawing and thinning of the outer edge of the strip as it is progressively squeezed between the irons. This action produces a lengthening of the outer edge of the strip, and the helix immediately adjusts itself to this new condition by contracting until its inner edge engages the surface of the barrel in the desired way. In the case under discussion the diameter of the shoulder 14 was one-quarter of an inch greater than that of the surface 15, while in another instance the difference amounted to as much as five-eighths of an inch. In both cases the fin was drawn sufficiently to make its inner edge tightly hub the smaller diametered cylindrical surface of the barrel. Whatever the character of the action may be, it results in an actual reduction of the diameter of the helix which is of such extent as to cause the inner edge of the strip 16 tightly to engage the surface of the barrel in the desired way. For purposes of description and claiming, this action will be referred to as a "drawing-out" of the fin.

The drawing operation proceeds in the foregoing manner until the ironing tools reach the position shown in dotted lines in Fig. 6, at which time the machine is brought to a stop. At this point, and while the major portion of the strip is still held in its tightened condition by its engagement with the tools 25, 26, the hooks 38 at its trailing end is inserted in a slot 39 of a clamp 40; the clamp is fitted over flange 13 of the barrel and is advanced manually along that flange in such a way as to draw the trailing end of the strip tightly to the barrel; and the trailing end is then secured in fixed relation to the barrel by turning down a set-screw 43 of the clamp. In many cases this completes the drawing-out step, and the tools may be backed away from the barrel. Before doing so, however, it is desirable to lessen the tension of spring 31 so that the tools will have no tendency to pull away the strip from the barrel in the backing-off operation.

Figure 16:
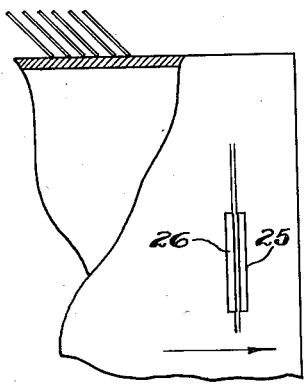
Fig. 16 is a sectional view of a fragment of a cylinder barrel with a cooling fin partially applied to its surface, the view illustrating the method of the invention at one of its intermediate steps.

It has been found in practice that the strip has a tendency to heel over when it is first drawn between the tools; and that this can readily be corrected by a repetition of the operation. In order to simplify the repeat step, it is preferred that, when the tendency to heel first appears, the strip be caused to turn away from the direction of movement of the tools, so that its convolutions will lie in the positions shown in Fig. 16. If this is done, then upon completion of the rundown of the tools in the direction indicated by the arrow (Fig. 16), and after the trailing end of the strip has been secured to the barrel by clamp 40, it is only necessary to reverse the machine to cause the strip to be drawn in the opposite direction. In this runback over the barrel the ironing tools will lift each convolution without interference from the next adjacent one, and without any change in adjustment will complete the drawing operation and cause the strip to assume a substantially perpendicular position on the surface of the barrel. Under these circumstances the drawing operation will be completed at the end of the runback and the tools may then be withdrawn after first loosening the spring 31, as heretofore mentioned.

Figure 17:
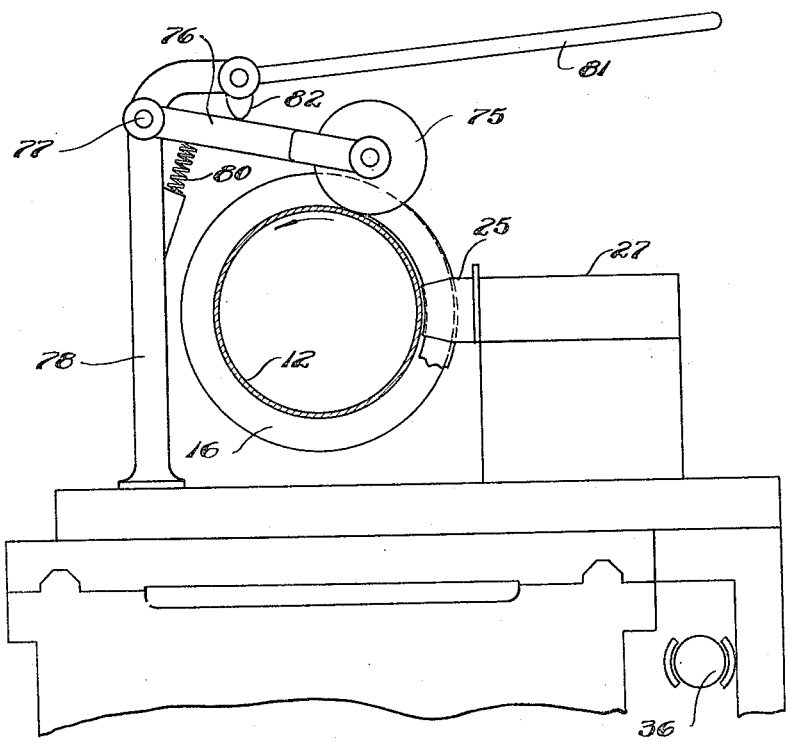
Fig. 17 is an end view of a portion of the machine of Fig. 6, with certain parts cut away and others omitted better to show the construction.
Figure 18:
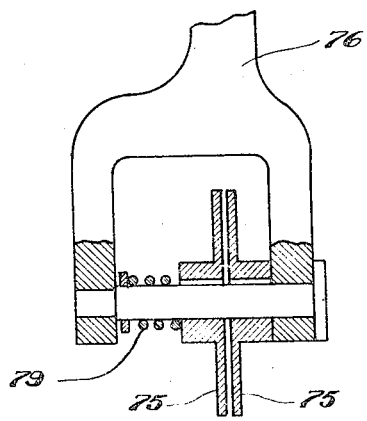
Fig. 18 is a plan view, partly in section, of a fragment of the structure of Fig. 17.

It has also been noted, particularly with barrels of larger sizes, that the strip does not assume a position tangent to the surface 15 immediately opposite the ironing tools, but first touches the barrel at a point some two or three inches behind the tools, as is shown in Fig. 17. If this condition tends to cause any inaccuracy in the locating and proper spacing of the convolutions of the fin, the defect may readily be corrected by engaging the strip between the surfaces of a pair of guide-rolls 75 mounted on the end of an arm 76 which is pivoted at 77 to an upright 78. The upright is secured to the traveling carriage of the machine so that it will advance the guide-rolls along the barrel at precisely the same rate as are the tools 25, 26; and the rolls 75 are preferably urged toward each other by a spring 79 (Fig. 18) so that they may engage the strip tightly enough to lay it on the barrel at precisely the desired rate, thereby to assure proper spacing between the convolutions. In the illustrated structure the arm 76 is urged away from the barrel by a spring 80 so that the rolls are normally held in an out-of-contact position. When it is desired to guide the strip in the manner just described, the arm is lowered by an appropriate movement of a lever 81 having a cam portion 82 which is adapted to engage the arm and press it downwardly.

Upon the completion of the drawing-out step the helical fin 16, held in its tightened condition upon the barrel by the engagement of its ends in the two clamping rings, is ready to be bonded to the surface 15. Where the fin is made of copper, as in the assumed case, it has been found that a low melting point silver solder will serve adequately to secure it to the barrel and at the same time to form a perfect thermal band therewith. In the preferred method, after first cleaning and fluxing both the barrel and the fin, a strip of solder wire 46 of appropriate character is hooked under the leading end of the fin, Fig. 3, within a notch 47 which has been provided for that purpose, and the barrel is again rotated whereby to wind the wire between the convolutions of the fin. During this operation a hand tool may be inserted between the fins and is pressed against the wire whereby to cause that element tightly to hug the surface 15. At the completion of the winding operation the tail end of the wire may be hooked under the trailing end of the fin within notch 48, if desired.

Figure 7:
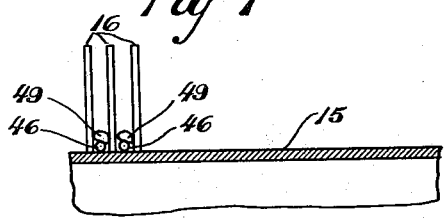
Fig. 7 is a sectional view of a fragment of the cylinder barrel after fins have been applied to its surface, and before those fins have been finally secured in place, this view illustrating yet a further one of the steps of the method.
Figure 8:
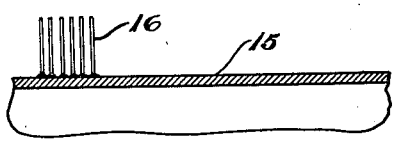
Fig. 8 is a sectional view, similar to Fig. 7, illustrating the cylinder after the fins have been finally secured to its surface.
Figures 13, 14:
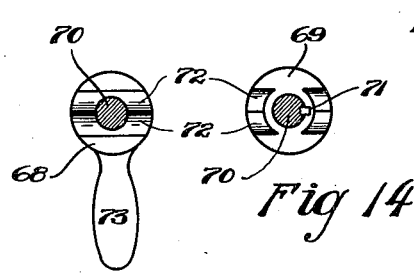
Figure 20:
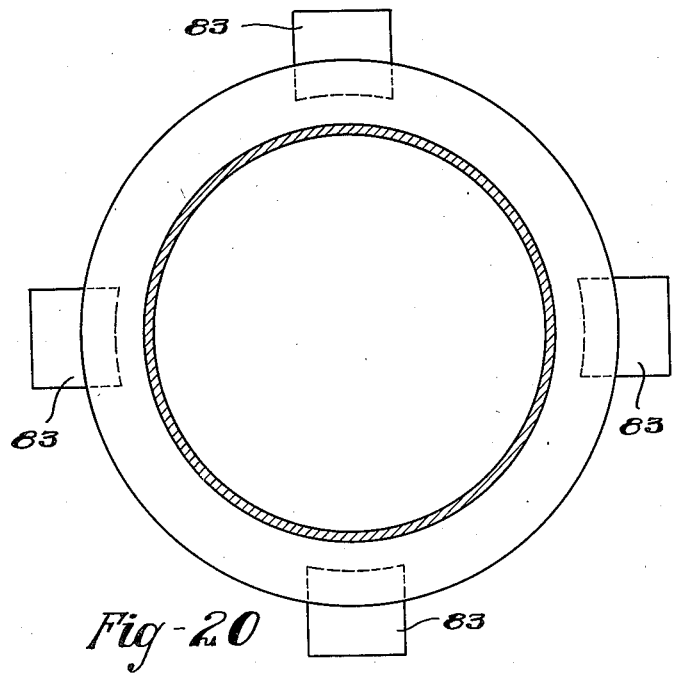
Figs. 19 and 20 illustrate one way in which the convolutions of a fin applied by the method of the invention may be held in spaced relation while they are being soldered to the barrel.
Figure 19:
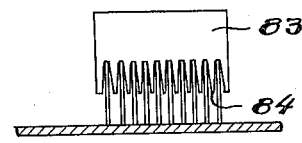

It will be recognized that when the barrel and fin are subsequently heated, the copper of the latter will expand to a considerably greater extent than will the steel of the former, and that this differential expansion will loosen the fin. It is desirable, therefore, to apply some means to the fin at this time which will hold its convolutions in the desired spaced relationship during the period of looseness. One such means may consist of a cord 49 of asbestos or glass fibre, which is of such size that when wound around the barrel it will fill the space between adjacent convolutions of the fin, wherefore to hold them in place, as is shown in Fig. 7. Another suitable means comprises a series of combs 83 applied to the fins at spaced points, with their teeth 84 engaging the convolutions to hold them in place, as is shown in Figs. 19 and 20. In still another instance a quick-setting cement was smeared over the fins, and this served adequately.

The barrel, fin, etc. are now ready to be heated for the purpose of fusing the solder wire. This operation may be performed in an induction furnace, or in any other suitable way. When a furnace of the character mentioned is employed, it is of importance that the clamping rings 20 and 40 shall be as thin as possible in order that the current needed for their heating may not be so high as to cause an overheating of the barrel.

It has been noted above that in the heating operation the copper fin will expand to a greater extent than will the steel barrel. This is of some advantage in that it permits the molten solder to flow under the fin and establish a perfect bond between its inner edge and the surface of the barrel. Insofar as the differential heating tends to loosen the fin, any bad effect is completely offset by the presence of the holding means which were described above. After the cylinder and fin have been cooled, and the solder has thoroughly set, the cord 49 or other holding means may be stripped away. The results of the bonding operation may be seen in Fig. 8.

It will be recalled that the method includes a final step the purpose of which is to straighten the strip and simultaneously to harden it where that is required. The copper strip of the illustrative case requires both, for at the completion of the bonding step it is usually badly warped and is in almost dead-soft condition. As a preliminary to this step the barrel is again set up on the stub arbor 21 of the machine of Fig. 6, with its driving flange engaged by the driving pin 34 of the face plate; the leading end of the strip is again engaged between the faces of the ironing tools 25 and 26; and the guide-rolls 75 which take no part in the hardening step are moved out of the way. The exact pressure which should be applied to the strip by tools 25 and 26, and spring 31, at this time, will again depend upon the size and character of the strip, and upon the extent of the work which is to be performed in this final step of the method. If, for example, straightening alone is required, then the tools need do no more than iron the strip, the spring 31 being adjusted accordingly. Where both straightening and hardening are required, as in the assumed case, then the spring must be adjusted to such a point that the tools actually deform the metal of the strip.

The preliminary set-up of the barrel, strip and tools in the machine having been completed, that machine may again be started. Obviously, rotation of the barrel around its own axis again results in the drawing of the strip between the faces of the ironing tools, thereby flattening and straightening it. Simultaneously, of course, the metal of the strip is progressively squeezed and cold-worked from one end to the other to such an extent as to work-harden it. After the entire strip has been ironed in this way, the machine may be stopped, the tools backed off, and the barrel 12 removed from the stub arbor. The driving ring 20 may be removed, as may also the clamp 40, and the two ends of the helical fin may now be cut away to the inner extremities of notches 47 and 48. These notches, it will be noticed (Figs. 3 and 4), are of some considerable extent, and are of such depth as to prevent the bonding of the ends of the strip to the cylinder barrel, wherefore to facilitate their ultimate removal. This cutting away of the leading and trailing ends of the strip may be performed immediately after the bonding operation, if that is desired. It is preferred, however, that they be retained in the clamps during the straightening and hardening step, so as to assure that the strip will not be pulled away from the barrel during this last-mentioned operation. When this straightening and hardening step has been completed, and the ends of the strip have been cut away, the entire finning operation is complete; and the barrel may be subjected to whatever treatment is required before it is incorporated as a part of a finished engine.

In carrying out the straightening and hardening step of the method, the ironing tools 25 and 26 may be advanced along the barrel by the automatic feed screw of the machine, just as they were advanced during the earlier applying and tightening step. It is preferred, however, that they be driven by the strip itself during this operation, so that they may follow precisely the lead of the strip. This may be done by releasing the carriage of the machine, and the frame 27 which it carries, from the automatic feed screw 36 through any usual clutch device (not shown). Under such circumstances the tools, squeezing the strip between them, must follow the lead of that strip when the barrel is rotated, thereby advancing themselves, frame 27, and the carriage.

It is further preferred, however, that the fin be relieved of the load of driving the carriage and other heavy parts. Thus in the machine of Figs. 6 and 11 it will be noted that the tools 25, 26 are mounted in a U-shaped block 50, which has a pair of trunnions 51 and 52 journaled in the forward ends of the arms 53 and 54 of the forked frame 27 so that the block, and the tools which it carries, may have some limited sliding movement in the frame 27 under certain circumstances hereinafter to be considered. It will also be noted that the block is provided with an arm 55 having a roller bearing 56 on its outer end which rides on the frame 27 to prevent rotation of the block in a counterclockwise direction; and that a stop element 57 has been provided to prevent rotation in the opposite direction.

In setting up the machine to perform the drawing-out step of the method, the block 50 is moved to the position shown in Fig. 6, with its left edge abutting against the arm 53 of the frame 27; and sufficient tension is applied to spring 58 by an adjustment of nuts 59 on the stud portion 60 of trunnion 51, to hold the block in this established position. With this set-up, frame 27 and block 50 are to all intents and purposes a single unit which can be advanced by feed screw 36 at a desired rate, consequently advancing the tools and performing the locating and drawing-out step of the method in the manner which has heretofore been described.

Where the machine of Figs. 6–11 is to be employed for carrying out the straightening and hardening step of the method, it is set up in a slightly different way from that just described. Thus, the tension of spring 58 is relieved by unscrewing nuts 59, the frame 27 is disengaged from the feed screw 36 and is backed up to such an extent that block 50 lies substantially midway between arms 53 and 54; and the feed screw 36 is then re-engaged with the frame through the usual clutch device. It is evident that with this setup, the frame 27 is adapted to be advanced lengthwise of the barrel by the feed screw 36 in precisely the same way that it was during the earlier fin-applying step. The block 50 and tools 25, 26 are, however, free to float on trunnions 51, 52, between arms 53 and 54 on the frame 27. These parts are, therefore, advanced along the barrel entirely by the engagement of the tools with the helical strip. In the event that the fin has been retained in the position originally established, the tools will be moved along the barrel in perfect unison with the frame 27. If, however, there has been a slight shifting of the positions of the convolutions of the fin, during the bonding step for example, then the tools will move block 50 in frame 27 so that they may follow precisely the lead of the fin during the hardening step. With this arrangement it is evident that the tools are always driven by the fin during the hardening and straightening step, and yet that fin is completely relieved of the load of driving the frame 27, the carriage, and other heavy parts of the machine.

The ironing of the strip during both the drawing-out step and the straightening and hardening one, places a very heavy load upon the tools 25 and 26 in a vertical direction. In order that this load may not be concentrated upon pivot pin 30 for the swinging tool 25, a member 63 is secured to the forward end of the block 50 with its arm 64 overlying the tools 25 and 26 so as to support them. It is evident, however, that vertical support may be provided for the arms in any other convenient and satisfactory way.

The machine is also provided with a quick-opening device 67 which facilitates the application of tension to spring 31 when the tools are engaged with the strip at the start of any drawing-out or straightening operation, and to relieve the tension of that spring at the completion of that operation. This device may be constructed in any desired way. As here shown, it comprises a pair of collars 68 and 69 (Figs. 6, 7, 13 and 14), of which the former is mounted to rotate upon a stub shaft 70 carried by the swinging arm 29, whereas collar 69 is keyed at 71 to the shaft so that it may not rotate but have some limited back-and-forth movement thereon. The two opposing faces 72 of the collars are cams, wherefore rotation of collar 68 through a quarter turn will move collar 69 outwardly to compress spring 31 or inwardly to relieve the tension of the spring, depending, of course, upon the direction of rotation. When the collars are in the position shown in full lines in Fig. 6, the tension of spring 31 is very light, or perhaps non-existent, and hence the tools 25 and 26 may readily be engaged with the leading end of strip 16. When that has been done, the collar 68 may be given a quarter turn in clockwise direction by its integral handle 73, thereby moving collar 69 to the right to compress spring 31 and apply its tension to the swinging arm. The machine may then be operated to carry out either the drawing-out step or the hardening one. At the completion of that operation, whatever its character, the collar 68 may be given a quarter turn in a counterclockwise direction to relieve the tension of spring 31, and allow the tools to be withdrawn from the strip with a minimum of effort. With this arrangement it will be apparent that screw 32 and locknut 33 need be used only for an initial adjustment of the tension of spring 31 to a desired value for the particular operation to be performed. If, for example, a series of identical fins are to be drawn out on the surfaces 15 of a series of barrels of the same size, the tension of spring 31 may be adjusted by screw 32 at the start of the drawing-out operation on the first of the cylinders, and that adjustment will serve for the entire group. Likewise, if a group of barrels are to have their fins straightened and hardened, a single adjustment of the screw for the first of the barrels is all that is required.

The machine which is illustrated in the drawings is intended for more or less universal use, and the stub 21 and face plate 22 are threaded to the mandrel (see Fig. 6) so that they may readily be removed and another arbor and face plate substituted to receive a barrel of different size from the one shown. Of equal importance, the ironing tools 25 and 26 are so designed and arranged that they may be employed to carry out either the drawing step, or the ironing-straightening step of the method, upon fins of different widths and thicknesses. Thus it will be observed that the inner faces of these members are substantially flat; and that the pivot pin 30 about which tool 25 swings has its bearing surface 74 (Fig. 15) formed eccentrically to the portion 85 at its lower end by which the pin is secured to block 50. With this arrangement any rotation of the pin 30 about its seat 86 in the block will move the rear end of tool 25 closer to or farther away from the rear end of tool 26. Thus the tools may be set with their faces at such an angle as to produce a thinning of the outer edge of the strip during a drawing-out operation, for example; or they may be set substantially parallel to one another for the performance of a straightening-ironing step. Likewise, of course, the positions of the tools may be adjusted to accommodate fins of greater or lesser thickness or various widths.

Figures 21, 22:
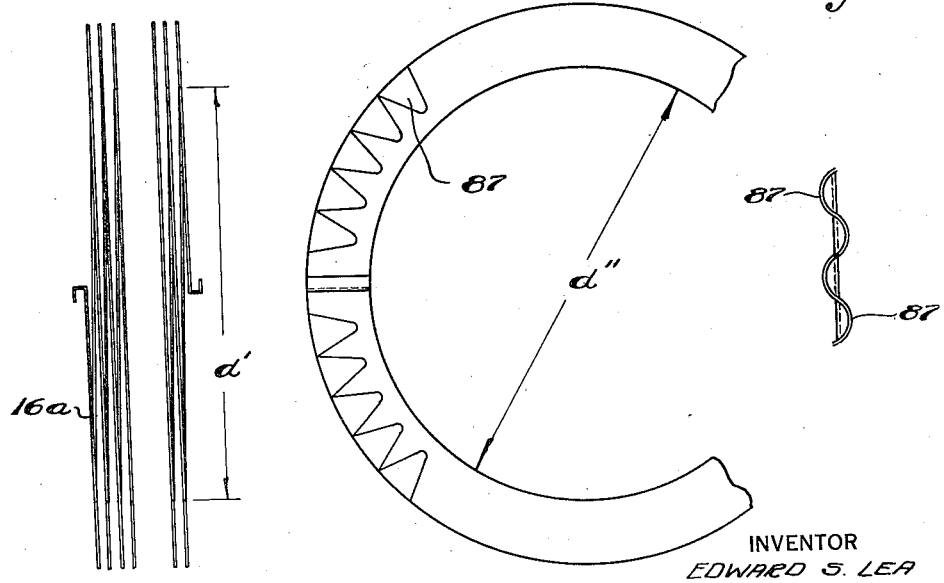
Fig. 21 is an elevational view of another helical strip which has been preformed in accordance with the modified method.
Fig. 22 is an end view of a fragment of the strip of Fig. 21 after it has been subjected to further treatment in accordance with the invention; and includes a section of that fragment after treatment.

The method of the invention is particularly advantageous in permitting the application of a preformed fin to a cylindrical surface having its ends bounded by enlarged portions which are of such a nature as to prevent the use of tight-fitting annular collars of the conventional kind. This desirable result follows from the fact that the preformed helix may be given an inside diameter such as to permit it to pass over one of the enlarged portions, and may then be contracted until the inner edge of the helix snugly engages the lesser diametered surface which is to be finned. In the method as so far described, the reduction of diameter is produced by a thinning and drawing of the strip of such a nature as to increase the actual length of its outside edge. The same result may be attained in a modified form of the method by an effective, rather than an actual, lengthening of the outer edge of the helix. In practicing this modified method, a strip of fin material $16a$ is first reduced to a helix having an inside diameter $d^1$ which is substantially equal to that of the surface 15 of the barrel, as shown in Fig. 21; and the helix is then treated in such a way as to produce a series of flutes. These flutes 87 taper inwardly from the outer edge of the strip and are of such width, depth and number as to decrease the effective length of the outer edge as compared with the actual length of the inner edge. This difference accommodates itself by an expansion of the helix until its new inside diameter $d''$ equals or slightly exceeds the outside diameter of the shoulder portion 14 of the barrel. The modified form of the invention from this point on is substantially identical with that first described. Thus, the fluted helix is passed endwise over the enlarged shoulder 14 so as to place it upon the smaller diametered surface 15; and the helix is then progressively drawn out for the dual purpose of laying its convolutions in predetermined spaced relationship and of flattening its flutes. The latter action, of course, lengthens the effective outer edge of the fin, and consequently reduces the inside diameter of the helix to that of the outside of the barrel. When this has been done, the fin may be secured in place, and may be straightened and hardened, if that is required, precisely as heretofore described.

The modified method may readily be practiced in the machine of the invention just as was the first method. Thus, when the fin has been fitted to the barrel, its leading end may be secured in the clamp 20, its opposite sides may be squeezed between the ironing tools 25 and 26, and the barrel may be rotated, wherefore to draw out the strip as just described. In practicing this form of the invention the ironing tools will be so adjusted as to do no more than flatten the strip, for any actual thinning of it will produce a wrinkled outer edge. Upon completion of the drawing-out step, and after the trailing end of the strip has been secured to the barrel, the fin may be soldered in place as heretofore described; and the barrel may again be set up in the machine and its strip re-engaged by the ironing tools preliminary to the carrying out of the straightening and hardening step.

Under certain circumstances it may be desirable to combine the two forms of the invention. In these cases the helix will be given an initial inside diameter in excess of that of the surface 15 to which it is to be applied; and its outer edge may be fluted to increase that diameter to such a value as to permit the helix to be passed over the enlarged shoulder. The strip will then be ironed in such a way as to flatten its flutes as well as to thin its outer edge, the combined action being such as to reduce the diameter of the helix until its inner edge hugs the barrel. From that point on, the fin may be treated precisely as heretofore set forth.

In the foregoing the method and apparatus have been described with particular reference to the application of a copper fin to a steel body. The method is not, however, so limited in its character. It may be used for applying a fin of any desired material. If, for example, steel fins are preferred, they may be applied to the illustrated cylinder barrel by the method much more readily and economically than by any presently known practice. Thus, a strip of comparatively soft steel may be reduced to helical form so that it may be fitted over the barrel, and its convolutions may be located and drawn out in exactly the same way as was the copper fin which has already been described. That steel strip may then be bonded to the cylinder by soldering, or, if more strength is required, by a brazing or welding operation. Finally, the strip may be mechanically worked to straighten it, and to harden it if that is required, exactly as heretofore described in connection with the copper strip.

It is likewise evident that the method is not limited to use in applying heat-radiating fins to the cylinders of internal combustion engines, or, in fact, to a body having the ends of its cylindrical surface bounded by enlarged shoulders or flanges. On the contrary, the method is readily applicable to the finning of conventional tubing, or of any other suitable body. Nor is the method of the invention confined to practice in the illustrated and described machine. Those familiar with the art will recognize that its several steps may be carried out by hand, appropriate tools being used wherever necessary, and that various forms of machines may be devised for practicing it. All of the foregoing should therefore be considered as descriptive of the invention, and not necessarily as a limitation upon its scope.

What I claim is:

1. The method of applying a cooling fin to an engine cylinder which comprises the steps of forming a barrel with a cylindrical outer surface lying between peripheral flanges near its ends; fitting a helix of flat strip metal endwise over said barrel, said helix having an inside diameter which is slightly greater than the outside diameter of the flange portion at one end of said barrel and materially greater than the outside diameter of said cylindrical surface; mechanically drawing said strip progressively from end to end to thin its outer edge sufficiently to cause its inner edge tightly to engage said cylindrical surface, while simultaneously disposing its convolutions in a desired spaced relation; and bonding said strip to said barrel by metal fusion at high temperature.

2. The method of applying a fin to the outer cylindrical surface of a barrel according to claim 1, further characterized in that said helical strip has its inner edge relieved at both its leading and tail ends, and in that such relief of the inner edge of said strip is sufficient to prevent the bonding of the leading and tail ends of said strip to said barrel, and in that said leading and tail ends of said strip are subsequently severed and removed.

3. The method of applying a cooling fin to a cylinder barrel comprising the step of fitting a preformed helix of thin strip metal endwise over the barrel; mechanically drawing said strip progressively from end to end to thin its outer edge sufficiently to cause its inner edge tightly to engage the barrel, while simultaneously disposing the convolutions of said strip in a desired spaced relation; bonding said strip to the barrel, said bonding step being carried out at a temperature which results in an annealing of said strip and a warping of its convolutions; and pinching said strip progressively from end to end to cold-work it to a desired hardness while simultaneously straightening its convolutions and causing them to stand substantially perpendicular to the barrel.

4. The method of applying a cooling fin to a cylinder barrel comprising the steps of fitting a helix of thin strip metal endwise over the barrel, said strip having its outer edge fluted; disposing the convolutions of said strip in upstanding spaced relation while simultaneously flattening the fluted outer edge whereby to cause its inner edge tightly to engage the barrel; bonding said strip to the barrel, said bonding step being carried out at a temperature which results in a warping of the convolutions of said strip; and mechanically working said strip progressively from end to end to straighten it and cause its convolutions to stand substantially perpendicular to its barrel.

5. The method of applying a cooling fin to an aircraft engine cylinder which comprises the steps of forming a barrel with an outer cylindrical surface lying between peripheral flanges near the ends thereof; fitting a helix of flat strip metal endwise over said barrel, said helix having an inside diameter which is slightly greater than the outside diameter of the flange on one end of said barrel and materially greater than that of said cylindrical surface; squeezing said strip progressively from end to end and to a varying extent across its face, said strip being squeezed beyond its elastic limit adjacent its outer edge and substantially not at all at its inner edge, whereby to thin its outer edge sufficiently to cause the inner edge thereof tightly to engage said cylindrical surface; simultaneously disposing the convolutions of said strip in a desired spaced relation; and bonding said strip to said barrel by metal fusion at high temperature.

6. The method of applying fins to a cylindrical body which comprises the steps of forming a helix of flat strip metal, which helix has an inside diameter substantially equal to that of the outside of said body; fluting the outer edge of said strip whereby to increase the inside diameter of said helix; fitting said helix endwise over said body; drawing out said helical strip and flattening the fluted portion whereby to increase the effective length of its outer edge with respect to that of its inner edge and to cause its inner edge tightly to engage the surface of such body, and simultaneously locating the convolutions of the helix at desired intervals along said body; bonding said strip to said body, said bonding step being carried out at a temperature which results in a warping of the convolutions of said strip; and mechanically working said strip progressively from end to end to straighten it and cause its convolutions to stand substantially perpendicular to said body.

EDWARD S. LEA.